United States Patent
Miyaguchi et al.

(10) Patent No.: US 10,081,714 B2
(45) Date of Patent: Sep. 25, 2018

(54) BIAXIALLY ORIENTED POLYAMIDE-BASED RESIN FILM, AND PRODUCTION METHOD THEREFOR

(71) Applicant: TOYOBO CO., LTD., Osaka-shi, Osaka (JP)

(72) Inventors: Yoshinori Miyaguchi, Inuyama (JP); Gaku Maruyama, Tsuruga (JP); Takanori Ishikura, Iwakuni (JP)

(73) Assignee: TOYOBO CO., LTD., Osaka (JP)

( * ) Notice: Subject to any disclaimer, the term of this patent is extended or adjusted under 35 U.S.C. 154(b) by 129 days.

(21) Appl. No.: 14/356,288

(22) PCT Filed: Dec. 3, 2012

(86) PCT No.: PCT/JP2012/081285
§ 371 (c)(1),
(2) Date: May 5, 2014

(87) PCT Pub. No.: WO2013/084845
PCT Pub. Date: Jun. 13, 2013

(65) Prior Publication Data
US 2014/0329078 A1    Nov. 6, 2014

(30) Foreign Application Priority Data

Dec. 5, 2011 (JP) ................................. 2011-266283

(51) Int. Cl.
| | | |
|---|---|---|
| B32B 27/00 | (2006.01) | |
| C08L 77/00 | (2006.01) | |
| C08J 5/18 | (2006.01) | |
| B29C 55/14 | (2006.01) | |
| C08G 69/40 | (2006.01) | |
| C08L 77/02 | (2006.01) | |
| B29C 55/06 | (2006.01) | |
| B32B 27/08 | (2006.01) | |
| B32B 27/16 | (2006.01) | |
| B32B 27/34 | (2006.01) | |
| B29K 77/00 | (2006.01) | |
| B29K 105/00 | (2006.01) | |
| B29L 7/00 | (2006.01) | |

(52) U.S. Cl.
CPC ............... *C08J 5/18* (2013.01); *B29C 55/065* (2013.01); *B29C 55/14* (2013.01); *B29C 55/143* (2013.01); *B32B 27/08* (2013.01); *B32B 27/16* (2013.01); *B32B 27/34* (2013.01); *C08G 69/40* (2013.01); *C08L 77/02* (2013.01); *B29K 2077/00* (2013.01); *B29K 2105/0085* (2013.01); *B29L 2007/002* (2013.01); *B32B 2255/10* (2013.01); *B32B 2255/205* (2013.01); *B32B 2307/4023* (2013.01); *B32B 2307/412* (2013.01); *B32B 2307/518* (2013.01); *B32B 2307/558* (2013.01); *B32B 2307/718* (2013.01); *B32B 2307/734* (2013.01); *B32B 2439/70* (2013.01); *C08J 2377/02* (2013.01); *C08J 2453/00* (2013.01); *C08J 2477/06* (2013.01); *C08L 2205/02* (2013.01); *Y10T 428/249981* (2015.04); *Y10T 428/31728* (2015.04)

(58) Field of Classification Search
None
See application file for complete search history.

(56) References Cited

U.S. PATENT DOCUMENTS

| | | | |
|---|---|---|---|
| 5,817,425 A | 10/1998 | Morishige et al. | |
| 2008/0206531 A1 | 8/2008 | Nishi et al. | |
| 2010/0221554 A1 | 9/2010 | Tsubouchi et al. | |
| 2012/0238667 A1 | 9/2012 | Gotou et al. | |
| 2014/0212646 A1 | 7/2014 | Miyaguchi et al. | |
| 2015/0210799 A1 | 7/2015 | Tanaka | |

(Continued)

FOREIGN PATENT DOCUMENTS

| | | |
|---|---|---|
| CN | 1074989 C | 11/2001 |
| CN | 1960869 A | 5/2007 |

(Continued)

OTHER PUBLICATIONS

Chinese Patent Office, First Office Action in Chinese Patent Application No. 201280059028.1 (dated Nov. 5, 2015).
Sanyo Chemical Industries, Ltd., Sanyo Chemical Product Outline entitled "Performance Chemicals for Polyurethane and Polyurethane-related Industries" (2016).
Japanese Patent Office, International Search Report in International Patent Application No. PCT/JP2014/054487 (dated May 13, 2014).
Japanese Patent Office, International Search Report in International Patent Application No. PCT/JP2014/054488 (dated Jun. 3, 2014).
Japanese Patent Office, Notification of Reasons for Rejection in Japanese Patent Application No. 2013-548225 (dated Apr. 5, 2016).

(Continued)

*Primary Examiner* — Ana Lucrecia Woodward
(74) *Attorney, Agent, or Firm* — Leydig, Voit & Mayer, Ltd.

(57) ABSTRACT

To provide a biaxially oriented polyamide-based resin film being excellent in laminate strength, pin-hole resistance under a low-temperature environment, impact resistance, and transparency, and which retains satisfactory a good external appearance even after being sterilized in hot water. A biaxially oriented polyamide-based resin film comprising a polyamide resin and 1 to 5% by mass of a polyamide-based block copolymer, wherein the polyamide-based block copolymer comprises a hard part including a residue of cyclic lactam having 4 to 10 carbon atoms, and a soft part including a residue of polyoxypropylene glycol or polyoxytetramethylene glycol having a weight average molecular weight of 500 to 3000, and the content X of the hard part and the content Y and the weight average molecular weight Mw of the soft part satisfy the following formulae (1) and (2):

$X+Y=100$(parts by mass)     (1)

$478.74 \times Mw^{-0.2989} \leq Y \leq 93$(parts by mass)     (2).

9 Claims, No Drawings

(56) References Cited

U.S. PATENT DOCUMENTS

| | | |
|---|---|---|
| 2016/0002419 A1 | 1/2016 | Miyaguchi |
| 2016/0002420 A1 | 1/2016 | Miyaguchi |

FOREIGN PATENT DOCUMENTS

| | | | |
|---|---|---|---|
| EP | 2974861 A1 | | 1/2016 |
| JP | H04-314741 A | | 11/1992 |
| JP | H05-230365 A | | 9/1993 |
| JP | H09-029910 A | | 2/1997 |
| JP | H09-039180 A | | 2/1997 |
| JP | H09-143283 A | | 6/1997 |
| JP | H11-322974 A | | 11/1999 |
| JP | 2000-025179 A | | 1/2000 |
| JP | 2002-166512 A | | 6/2002 |
| JP | 2002-179817 A | | 6/2002 |
| JP | 2002-348465 A | | 12/2002 |
| JP | 2004-137394 A | | 5/2004 |
| JP | 2004-352796 A | | 12/2004 |
| JP | 2005-194417 A | | 7/2005 |
| JP | 2006-037070 A | | 2/2006 |
| JP | 2007-015304 A | | 1/2007 |
| JP | 2010-234552 A | | 10/2010 |
| JP | 2010-253711 A | | 11/2010 |
| JP | 2010-253713 | * | 11/2010 |
| JP | 2010-253713 A | | 11/2010 |
| JP | 2013-023656 A | | 2/2013 |
| WO | WO 2013/027476 A1 | | 2/2013 |

OTHER PUBLICATIONS

Chinese Patent Office, The Second Office Action in Chinese Patent Application No. 201480012908.2 (dated Mar. 27, 2017).

Chinese Patent Office, The First Office Action in Chinese Patent Application No. 201480012003.5 (dated Feb. 4, 2017).

Chinese Patent Office, First Office Action in Chinese Patent Application No. 201480012908.2 (dated Jul. 26, 2016).

European Patent Office, Extended European Search Report in European Patent Application No. 14763682.3 (dated Sep. 5, 2016).

European Patent Office, Extended European Search Report in European Patent Application No. 14764251.6 (dated Sep. 14, 2016).

Taiwan Patent Office, The First Office Action in Taiwanese Patent Application No. 103107017 (dated May 26, 2017).

Chinese Patent Office, The Second Office Action in Chinese Patent Application No. 201480012003.5 (dated Oct. 9, 2017).

Chinese Patent Office, Decision of Rejection in Chinese Patent Application No. 201480012908.2 (dated Aug. 14, 2017).

Japanese Patent Office, International Search Report in International Patent Application No. PCT/JP2012/081285 (dated Feb. 19, 2013).

U.S. Appl. No. 14/769,758, filed Aug. 21, 2015.

U.S. Appl. No. 14/769,737, filed Aug. 21, 2015.

Chinese Patent Office, The First Office Action in Chinese Patent Application No. 201611104773.X (dated Apr. 4, 2018) English translation.

* cited by examiner

BIAXIALLY ORIENTED POLYAMIDE-BASED RESIN FILM, AND PRODUCTION METHOD THEREFOR

CROSS-REFERENCE TO RELATED APPLICATIONS

This patent application is the U.S. national phase of International Patent Application No. PCT/JP2012/081285, filed Dec. 3, 2012, which claims the benefit of Japanese Patent Application No. 2011-266283, filed on Dec. 5, 2011, which are incorporated by reference in their entireties herein.

TECHNICAL FIELD

The present invention relates to a biaxially oriented polyamide-based resin film suitable for various packaging applications and packaging materials having a high design property by taking advantage of transparency, the biaxially oriented polyamide-based resin film being excellent in laminate strength, impact resistance, pin-hole resistance (bending fatigue resistance), particularly pin-hole resistance under a low-temperature environment, transparency and stab resistance, and being effective for prevention of bag breakage during transportation and storage of commercial products and also effective for prevention of falling bag breakage of large heavy bags for business use when used for packaging materials for food packaging and the like, and a production method therefor.

BACKGROUND ART

Conventionally, unstretched films and stretched films made of aliphatic polyamide typified by nylon 6 and nylon 66 are excellent in impact resistance and pin-hole resistance, and are widely used for various packaging materials.

In liquid-filled packages for soups and seasoning agents, pin-hole-resistant stretched polyamide-based resin films are widely used which are further softened by mixing various elastomers with aliphatic polyamide in a single-layer configuration for improving pin-hole resistance and impact resistance.

In the conventional pin-hole-resistant films, films in which a polyolefin-based elastomer is mixed with aliphatic polyamide have the problem that although pin-hole resistance and impact resistance are satisfactory at normal temperature, but pin-hole resistance and impact resistance are degraded under a low-temperature environment, so that pin-holes easily occur due to bending fatigue during transportation of commercial products. The occurrence of pin-holes in packaging materials of commercial products may cause contamination by leakage of contents, decay of contents and generation of fungus, leading to a reduction in commercial value.

For solving such a problem, for example, Patent Documents 1 and 2 describe films in which a polyamide-based elastomer is mixed with aliphatic polyamide. The films described in Patent Documents 1 and 2 have satisfactory pin-hole resistance and impact resistance under a low-temperature environment and are hard to cause pin-holes due to bending fatigue even under a low-temperature environment.

However, the films described in Patent Documents 1 and 2 have the problem that the film has a reduced laminate strength when a polyethylene film is dry-laminated for imparting heat seal performance.

Since the dispersion diameter of a polyamide elastomer in aliphatic polyamide is large, impact when a bag forming article is caused to fall successively propagates to polyamide elastomer particles having a large particle size dispersed in a polyamide film, so that the film tends to easily tear in a thickness direction. Therefore, large liquid product bags using a pin-hole resistant polyamide film having a polyamide elastomer added are subject to falling bag breakage.

Further, in the case of bag forming articles of a polyamide-based film/polyethylene resin configuration in which the thickness of a polyethylene resin layer for imparting heat seal performance is increased or a harder polyethylene resin is selected for the purpose of imparting stiffness to the bag forming article in order to improve handling characteristics during bag formation processing and workability at the time of filling the bag with contents, the bag forming article has increased stiffness, but tends to get pin-holes. Therefore, polyamide-based films to be used for these bag forming articles are required to have further enhanced pin-hole resistance.

However, when the content of a polyamide elastomer in the film is increased for enhancing pin-hole resistance, the problem arises that the laminate strength is further reduced and transparency is also deteriorated.

Demand is also growing for large liquid product bags for business use which have a volume of not less than 1 liter, and bag-in-boxes having a packaging form in which large plastic bags are included in a corrugated carton to store and transport products. Polyamide films to be used for these bags considerably require pin-hole resistance and impact resistance, and require strong falling bag breakage resistance and strong cohesive fracture strength in a film thickness direction in order to package a larger-volume liquid product.

Further, there exist many commercial products in the market, the quality assurance period of which is extended by boiling a packaging bag filled with contents in hot water to be sterilized, and these bags are required to retain adhesive strength in hot water, retain adhesive strength under water attaching conditions, and cause no external appearance deterioration such as whitening in water.

Thus, current pin-hole-resistant polyamide-based films cannot sufficiently satisfy quality that is required in the market.

PRIOR ART DOCUMENTS

Patent Documents

Patent Document 1: JP-A-2002-179817
Patent Document 2: JP-A-hei-11-322974

SUMMERY OF THE INVENTION

Problems to be Solved by the Invention

In view of the problems of the current pin-hole-resistant polyamide-based films, an object of the present invention is to provide a biaxially oriented polyamide-based resin film suitable for various packaging applications, which is excellent in laminate strength, impact resistance, transparency, stab resistance and pin-hole resistance, particularly pin-hole resistance under a low-temperature environment, and has an excellent effect of preventing bag breakage during transportation and storage of commercial products, and the like, and is also effective for prevention of falling bag breakage of large heavy bags for business use and the like when used for packaging materials for food packaging and the like, and which retains satisfactory adhesive strength and a good external appearance even after being sterilized in hot water, and a production method therefor.

Solutions to the Problems

For solving the above-described problems, the present inventors have conducted extensive studies, and resultantly have completed the present invention. A film solved the above-described problems is a biaxially oriented polyamide-based resin film comprising a polyamide resin and a polyamide-based block copolymer, wherein the polyamide-based resin film comprises 1 to 5% by mass of the polyamide-based block copolymer, and the polyamide-based block copolymer comprises a hard part including a residue of cyclic lactam having 4 to 10 carbon atoms, and a soft part including a residue of polyoxypropylene glycol or polyoxytetramethylene glycol, wherein the soft part has a number average molecular weight of 1000 to 3000, and the content X of the hard part, the content Y of the soft part, and the number average molecular weight Mn of the soft part satisfy the following formulae (1) and (2):

$$X+Y=100 \text{(parts by mass)} \quad (1)$$

$$478.74 \times Mn^{-0.2989} \leq Y \leq 93 \quad (2).$$

The biaxially oriented polyamide-based resin film preferably contains 0.05 to 0.30% by mass of ethylene-bis-stearic acid amide, and contains 0.3 to 0.8% by mass of porous aggregated silica having a pore volume of 1.0 to 1.8 ml/g and an average particle size of 2.0 to 7.0 μm.

Furthermore, a layer configuration of the biaxially oriented polyamide-based resin film is preferably a single layer configuration or a co-extrusion laminated configuration of two or more layers.

A method for producing the film is that a polyamide-based resin sheet cooled and solidified by an electrostatic adhesion method is stretched in a longitudinal direction at two stages, then stretched in a lateral direction in a differential-temperature manner with the stretching end temperature being higher than the stretching start temperature, then subjected to a heat fixing treatment, then subjected to an initial relaxation treatment, and subjected to a re-relaxation treatment at a temperature lower than the initial relaxation temperature.

Effect of the Invention

The biaxially oriented polyamide-based resin film of the present invention has excellent flexibility and pin-hole resistance, and excellent falling bag breakage resistance resulting from high laminate strength, and is high in transparency and excellent in slippage, and therefore has good workability in printing processing and bag formation processing.

The biaxially oriented polyamide-based resin film is suitable for large liquid product bags because it has high laminate strength and therefore exhibits excellent falling bag breakage resistance and water-resistant adhesiveness.

Further, the biaxially oriented polyamide-based resin film has high transparency, and therefore can be suitably used for a wide range of packaging applications including packages with a high design property, which are required to have transparency.

MODE FOR CARRYING OUT THE INVENTION

Embodiments of the biaxially oriented polyamide-based resin film of the present invention will be described in detail below.

The present invention is a biaxially oriented polyamide-based resin film comprising a polyamide resin and a polyamide-based block copolymer (elastomer), wherein the polyamide-based resin film comprises 1 to 5% by mass of the polyamide-based block copolymer, and the polyamide-based block copolymer comprises a hard part including a residue of cyclic lactam having 4 to 10 carbon atoms, and a soft part including a residue of polyoxypropylene glycol or polyoxytetramethylene glycol, wherein the soft part has a number average molecular weight of 1000 to 3000, and the content X of the hard part, the content Y of the soft part and the number average molecular weight Mn of the soft part satisfy the following formulae (1) and (2):

$$X+Y=100 \text{(parts by mass)} \quad (1)$$

$$478.74 \times Mn^{-0.2989} \leq Y \leq 93 \text{ (parts by mass)} \quad (2).$$

In the present invention, polyamide resins such as nylon 6, nylon 7, nylon 11, nylon 12, nylon 66, nylon 6T, nylon MXD6 (polymethaxylylene adipamide), nylon 6I and nylon 46, or a copolymer, a blend or an alloy thereof is used as the polyamide resin. Among them, nylon 6, nylon 6T, nylon 6I and nylon MXD 6 or a blend thereof is preferably used.

The oligomer content of the polyamide resin is preferably not more than 1% by mass. When the oligomer content is more than 1% by mass, the oligomer is easily attached to a cooling roll in a step of winding a molten polyamide-based resin mixture, which is extruded from a die, around the cooling roll to be solidified into a sheet shape.

When nylon 6 is used as the polyamide resin, the relative viscosity of nylon 6 is preferably 2.5 to 3.6.

When the relative viscosity is less than 2.5, the impact strength of the biaxially stretched film decreases. On the other hand, when the relative viscosity is more than 3.6, both ends of the film may be whitened or broken during lateral stretching.

In the present invention, the content of the polyamide-based block copolymer in the film is required to be 1 to 5% by mass.

When the content of the polyamide-based block copolymer is less than 1% by mass, the film has excellent laminate strength, but does not exhibit pin-hole resistance. On the other hand, when the content is more than 5% by mass, the film has excellent pin-hole resistance, but its laminate strength and impact strength decrease, leading to a reduction in stiffness of the film. Consequently, bag breakage easily occurs because the falling bag breakage resistance and rigidity of a bag forming article using the biaxially oriented polyamide-based resin film are reduced. Further, when the content is more than 5% by mass, transparency of the film is deteriorated, so that the film cannot be applied to packaging materials having a high design property by taking advantage of transparency.

In the present invention, the polyamide-based block copolymer is a substance having rubber-like elasticity, wherein a hard part includes a residue of cyclic lactam having 4 to 10 carbon atoms, a soft part includes a residue of polyoxypropylene glycol or polyoxytetramethylene glycol, in which the soft part has a number average molecular weight of 1000 to 3000, and a compound having a reactive group for binding the hard part and the soft part with each other is introduced in a molar number equal to that of the polyoxyalkylene glycol that forms the soft part.

As the compound having a reactive group, a compound having an isocyanate group, an epoxy group, a carboxylic acid group or the like is used, and from the viewpoint of productivity in a step of polymerizing the polyamide-based block copolymer, an aliphatic dicarboxylic acid such as succinic acid, glutaric acid or adipic acid, an aromatic dicarboxylic acid such as terephthalic acid, isophthalic acid or orthophthalic acid, or anhydride thereof is preferably used, and an aliphatic dicarboxylic acid is further preferably used.

When the hard part is a residue of a cyclic lactam having less than 4 of carbon atoms, for example, β-propiolactam, the pin-hole resistance of the film is reduced. On the other hand, when the hard part is a residue of a cyclic lactam having more than 10 of carbon atoms, for example, ω-lauric lactam, the dispersion particle size of the polyamide-based block copolymer is large, so that when falling impact or the like is transmitted into a film layer, impact propagates among dispersion particles, leading to occurrence of cohesive fracture in the nylon film layer. Consequently, a film using a block copolymer in which the hard part is a residue of ω-lauric lactam exhibits excellent flexibility and pin-hole resistance, but cannot have both high laminate strength and falling bag breakage resistance required as a large liquid product bag. Therefore, this film is suitable for small bags such as small bags for soups, but is not suitable for large liquid product bags for business use, bag-in-box packages, and the like.

When the polyamide resin is nylon 6, it is preferred that for the hard part of the polyamide-based block copolymer, ε-caprolactam having a similar structure is used.

When the hard part is a residue of ε-caprolactam, adhesiveness at an interface between nylon 6 as a principal resin that forms the film and the block copolymer is improved, so that fracture of the interface is hard to occur even if large impact is transmitted. Since compatibility between nylon 6 and the block copolymer is improved, the dispersion particle size of the polyamide-based block copolymer decreases, so that fracture of the interface in the film layer is hard to propagate to each dispersion particle of the polyamide-based block copolymer. Consequently, the film has high laminate strength and enhanced falling bag breakage resistance.

When the dispersion particle size of the polyamide-based block copolymer excessively decreases, rubberlike elasticity is hard to be exhibited, and a large amount of the polyamide-based block copolymer is required for obtaining flexibility and pin-hole resistance required as a liquid product packaging bag.

For achieving all of excellent laminate strength, falling bag breakage resistance, flexibility and pin-hole resistance, it is important to first improve compatibility with the polyamide resin as a film base to increase an adhesive force of the interface between the polyamide resin and the polyamide-based block copolymer, and for additionally improving exhibition of rubber-like elasticity of the polyamide-based block copolymer, it is important to have a composition that does not lead to a very small dispersion particle size. For this purpose, it is important that the content and the number average molecular weight of the soft part of the polyamide-based block copolymer fall within a preferred range.

On the other hand, when the soft part includes a residue of polyoxyethylene glycol, the biaxially oriented polyamide-based resin film is whitened into a pearl tone if the film is boiled or immersed in water. When the soft part includes a residue of polyoxyhexamethylene glycol, a strand of the polyamide-based block copolymer taken from a polymerization tank is so soft that a cutting failure occurs to cause frequent occurrence of so called a nonstandard-shaped chip having a length of more than 5 cm or having several to ten or more pieces linked without being completely cut, leading to a reduction in productivity in the polymerization step.

Therefore, in the present invention, the soft part of the polyamide-based block copolymer is polyoxypropylene glycol or polyoxytetramethylene glycol. The number average molecular weight of polyoxypropylene glycol or polyoxytetramethylene glycol is necessarily 500 to 3000, preferably 850 to 2800, further preferably 1000 to 2500, and most preferably 1300 to 2300.

When the number average molecular weight is less than 500, the pin-hole resistance of the film is hardly improved. On the other hand, when the number average molecular weight is more than 3000, not only the laminate strength of the film decreases, but also transparency of the film is deteriorated. Therefore, the biaxially oriented polyamide-based resin film cannot be applied to large liquid product bags for business use, bag-in-boxes and packaging materials having a high design property by taking advantage of transparency.

For improving the pin-hole resistance of the film, the content of the soft part is required to be increased when the number average molecular weight of polyoxypropylene glycol or polyoxytetramethylene glycol for use in the soft part is low. On the other hand, when the number average molecular weight is large, the content of the soft part may be low. That is, for exhibiting excellent pin-hole resistance, the content X (parts by mass) of the hard part, and the content Y (parts by mass) of the soft part and the number average molecular weight Mn of the soft part are required to satisfy $478.74 \times Mn^{-0.2989} \leq Y \leq 93$ where $X+Y=100$.

When Y is less than $478.74 \times Mn^{-0.2989}$ parts by mass, the pin-hole resistance of the film is deteriorated because the dispersion particle size of the polyamide-based block copolymer is excessively small. On the other hand, when Y is more than 93 parts by mass, not only the polymerization reactivity of the polyamide-based block copolymer is reduced, but also a strand of the polyamide-based block copolymer taken from a polymerization tank is so soft that a cutting failure occurs to cause frequent occurrence of a nonstandard-shaped chip, leading to a reduction in productivity in the polymerization step. Further, the film is easily cohesively fractured because the dispersion particle size of the polyamide-based block copolymer in the film is excessively large. Consequently, when the biaxially oriented polyamide-based resin film and a polyethylene-based film are laminated to each other, excellent laminate strength cannot be obtained even if adhesiveness of both the films is sufficient.

For example, when the number average molecular weight of the soft part is 650 to 850, the pin-hole resistance of the film is improved to a level required for a low-temperature distribution liquid product bag if 70 parts or more by mass of the soft part is contained based on 100 parts by mass of the total of the hard part and the soft part. When the weight average molecular weight of the soft part is 1000 to 2500, the pin-hole resistance of the film is improved to the above-mentioned level if 62 parts or more by mass of the soft part is contained based on 100 parts by mass of the total of the hard part and the soft part.

For cutting a strand of the polyamide-based block copolymer into chips in the polymerization step, a strand cutting method, an underwater cutting method, a dicer cutting method, and the like can be used. Among them, the underwater cutting method is preferred for suppressing occurrence of nonstandard-shaped chips in the polymerization step and raw material segregation in the film production step.

In the present invention, the film may contain various additives such as a lubricant, an anti-blocking agent, a heat stabilizer, an antioxidant, an antistatic agent, a light-resistant agent and an impact resistance modifier within the bounds of not inhibiting properties of the film. Particularly, when 0.05 to 0.30% by mass of an organic lubricant such as ethylene-bis-stearic acid amide is contained in the film, slippage of the film is further improved.

The content of ethylene-bis-stearic acid amide in the film is less than 0.05% by mass, the lubricant may not contribute to improvement in slippage. On the other hand, when the content is more than 0.30% by mass, transparency of the film and adhesiveness of the film surface may be deteriorated because ethylene-bis-stearic acid amide is excessively bled out to the film surface.

Preferably the film contains inorganic fine particles having a predetermined pore volume for improving slippage. For the inorganic fine particles, silica, titanium dioxide, talc, kaolinite, calcium carbonate, calcium phosphate, barium sulfate or the like is used. Particularly, porous aggregated silica is easily subjected to adjustment of the pore volume, so that good transparency can be maintained even when the film contains the silica in such an amount that good slippage can be imparted.

The pore volume of porous aggregated silica is preferably 1.0 to 1.8 ml/g, and further preferably 1.2 to 1.7 ml/g.

When the pore volume is more than 1.8 ml/g, the height of surface projections may decrease to deteriorate slippage of the film because porous aggregated silica is easily deformed when an unstretched film is stretched. When the pore volume is less than 1.0 ml/g, transparency of the film may be deteriorated because voids are excessively formed on the periphery of porous aggregated silica when an unstretched film is stretched.

The average particle size of porous aggregated silica is preferably 2.0 to 7.0 μm, and further preferably 3.5 to 7.0 μm.

When the average particle size is less than 2.0 μm, sufficient slippage may not be obtained because surface projections are hard to be formed on the film during stretching. On the other hand, when the average particle size is more than 7.0 μm, transparency may be deteriorated because surface projections are so large that light is easily scattered on the film surface. Further, porous aggregated silica easily falls off due to contact with a conveyance roll used in the step of producing or processing the film.

The content of porous aggregated silica in the film is preferably 0.3 to 0.8% by mass, and further preferably 0.4 to 0.7% by mass. When the content is less than 0.3% by mass, surface projections may be insufficient, leading to deterioration in slippage of the film under a high humidity. On the other hand, when the content is more than 0.8% by mass, transparency of the film may be deteriorated.

In the present invention, a polyamide-based resin mixture is supplied to an extruder, extruded from a T-die at 240 to 290° C., and cooled and solidified by a cooling roll at 20 to 50° C. to obtain an unstretched sheet.

Preferably an electrostatic adhesion method or a liquid coating adhesion method is used in order to enhance adhesion property between the sheet and the cooling roll for the purpose of improving flatness of the unstretched sheet.

When the electrostatic adhesion method is used, preferably the sheet is brought into adhesion with the cooling roll using streamer corona discharge generated by applying a direct-current high voltage of 2 to 30 kV to an electrode for making crystallinity of the sheet uniform to reduce thickness unevenness after stretching. As the electrode, one having a large number of needle-shaped or sawtooth-shaped projections capable of corona discharge, i.e. having a specific resistivity of not more than 5 μΩ·cm is preferably used, and the curvature radius of the projection tip is preferably 0.01 to 0.07 mm.

An applied voltage of less than 2 kV leads to glow discharge and an applied voltage of more than 30 kV leads to spark voltage, so that streamer discharge may not be obtained with stability in either case.

When the curvature radius is less than 0.01 mm, the tip part is easily damaged when the electrode is handled, and abnormal discharge resulting from the damage easily occurs. On the other hand, when the curvature radius is more than 0.07 mm, the applied voltage is required to be increased, and therefore spark discharge easily occurs.

In the present invention, the polyamide-based resin film is produced by uniaxially or biaxially stretching an unstretched film obtained by melt-extruding a mixture containing a polyamide resin and a polyamide-based block copolymer. Specifically, a sequential biaxial stretching method can be suitably employed in which an unstretched sheet melt-extruded from a T-die is stretched longitudinally and then laterally or laterally and then longitudinally.

When a longitudinal-longitudinal two-stage stretching method with a roll type stretching machine is used in the case where the sheet is stretched longitudinally and then laterally, bowing is reduced, so that a biaxially oriented polyamide-based resin film having a small difference in physical properties in a width direction can be obtained.

In the longitudinal-longitudinal two-stage stretching method, preferably the sheet is stretched at a ratio of 1.3 to 2.0 at a temperature of 80 to 90° C., and subsequently stretched at a ratio of 1.6 to 2.4 at a temperature of 65 to 75° C. without being cooled to a temperature equal to or lower than Tg. The total ratio defined by a product of a stretch ratio in the first stage and a stretch ratio in the second stage is preferably 2.8 to 4.0. As a method for heating a sheet, a heating roll method or an infrared radiation method can be employed.

When the stretch ratio in the first stage is less than 1.3 or the stretch ratio in the second stage is less than 1.6, the film tends to be significantly deformed when boiled. On the other hand, when the stretch ratio in the first stage is more than 2.0, thickness unevenness in the longitudinal direction tends to increase, and when the stretch ratio in the second stage is more than 2.4, the film tends to be broken in the lateral stretching step. When the total ratio is less than 2.8, thickness unevenness in the longitudinal direction tends to increase, and when the total ratio is more than 4.0, the film tends to be broken in the lateral stretching step.

In the present invention, for lateral stretching in a tenter type stretching machine, which is performed subsequent to longitudinal stretching, it is preferred to use a differential temperature stretching method in which the temperature of a stretching start zone is set to the lowest stretching temperature, and the temperatures of zones in subsequent stages are sequentially elevated, so that the temperature of a stretching end zone is the highest temperature. When the differential temperature stretching method is used, bowing is reduced, so that a biaxially oriented polyamide-based resin film having a small difference in physical properties in a width direction can be obtained, and further the film is less deformed when boiled.

In the differential temperature stretching method, the sheet is laterally stretched at a ratio of 2.8 to 4.5 at a temperature of 110 to 170° C., preferably 120 to 160° C., and it is preferred to stretch the sheet in different temperature regions of two or more zones, preferably three or more zones.

When the stretch ratio is less than 2.8, thickness unevenness in the lateral direction tends to increase. On the other hand, when the stretch ratio is more than 4.5, not only the thermal shrinkage in the lateral direction tends to increase, but also both ends of the film are easily whitened or broken.

When the stretching temperature is lower than 110° C., the film tends to be significantly deformed when boiled. On the other hand, when the stretching temperature is higher than 170° C., thickness unevenness in the lateral direction tends to increase.

In the present invention, preferably the heat fixing treatment after biaxial stretching is performed at a temperature of 180° C. to 220° C. after the temperature is gradually elevated from a temperature close to the stretching end temperature, and the highest temperature is further preferably a temperature of 205 to 215° C.

When the heat fixing treatment temperature is lower than 180° C., not only the thermal shrinkage of the film tends to increase, but also laminate strength tends to decrease. On the other hand, when the heat fixing treatment temperature is higher than 220° C., the impact strength of the film tends to decrease. That is, preferably the fixing treatment temperature is set so that both the laminate strength and impact strength of the film are secured.

In the present invention, preferably a relaxation treatment is performed at a rate of 2 to 10% in the lateral direction after the heat fixing treatment.

When the relaxation rate is less than 2%, the thermal shrinkage of the film tends to increase. On the other hand, when the relaxation rate is more than 10%, not only the film comes into contact with a hot air outlet, so that the film is easily scratched, but also bowing is increased, leading to an increase in a difference in physical properties in the width direction of the film.

Preferably, a relaxation treatment is once performed at a temperature close to the highest temperature in the heat fixing treatment, and a re-relaxation treatment is then performed at a temperature lower than the relaxation treatment temperature by 20 to 30° C. for decreasing the thermal shrinkage in the lateral direction while a difference in physical properties in the width direction of the film due to bowing is not increased. The relaxation rate in this case is defined by a sum of the first relaxation rate and the re-relaxation rate.

When a relaxation treatment in the longitudinal direction is then performed between a tenter type stretching machine and a film winder, bowing is reduced, so that a difference in physical properties in the width direction of the film further decreases.

In the present invention, the biaxially oriented polyamide-based resin film may be produced by so called a co-extrusion method. The lamination method in the co-extrusion method may be in-die lamination using a multi-manifold die, or may be out-of-die lamination using a feed block.

A coating liquid of a resin having slipperiness, bondability and gas barrier property may be applied between a roll type stretching machine and a tenter type stretching machine to impart various functions to the film.

Further, the film may be subjected to a humidity control treatment for improving dimensional stability. In addition, for improving adhesion of the film with a print ink, a deposited metal, a deposited metal oxide, an adhesive used in lamination, or the like, the surface of the film may be subjected to a corona treatment, a plasma treatment, a flame treatment, or the like.

Even if a recovered raw material prepared by crushing and then melting or pressing together both ends of the film which are cut at the time of winding up the film with a film winder, or parts other than a product roll which are generated at the time of cutting the film into the product roll by a slitter is contained in the film in an amount of about 50% by mass, problems such as coloring and generation of foreign matters do not occur.

In the present invention, since laminate strength when a biaxially oriented polyamide-based resin film and a polyethylene-based film are laminated with an adhesive interposed therebetween is not less than 7 N/15 mm, and the number of defects in the Gelbo-Flex test at 1° C. is not more than 5, the film can be applied to not only small bags for soups and the like, but also pickled vegetable bags, low-temperature distribution liquid product bags, and large liquid product bags for business use.

Since the film has an impact strength of not less than 0.9 J with a thickness of 15 μm, the bag is hard to get holes even if the corner of a sealed part of the bag or a protrusive object other than the bag sticks in transportation of the liquid product bag under a low-temperature environment or falling of the liquid product bag.

Further, the film has a static friction coefficient of not more than 0.8, and therefore has good bag formation processability, and the film has a haze of not more than 4.5%, and therefore can be applied to packaging materials having a high design property by taking advantage of transparency.

The present application claims the benefit of the priority date of Japanese patent application No. 2011-266283 filed on Dec. 5, 2011. All of the contents of the Japanese patent application No. 2011-266283 filed on Dec. 5, 2011, are incorporated by reference.

EXAMPLES

Next, the present invention will be described more in detail by way of Examples, but the present invention is not limited to the following Examples. The film was evaluated according to the following measurement methods.

(1) Impact Strength

Impact strength was measured ten times under an environment of a temperature of 23° C. and a relative humidity of 65% using a film impact tester manufactured by Toyo Seiki Seisaku-Sho, Ltd., and evaluated with the average of the measurements.

(2) Pin-Hole Resistance

A number of pin-holes was measured according to the method described below using a Gelbo-Flex tester with a thermostatic bath, BE 1006 manufactured by TESTER SANGYO CO., LTD.

A polyester-based adhesive (mixture obtained by mixing TM-590 (product name) and CAT-56 (product name) manufactured by Toyo-Morton, Ltd. at a mass ratio of 6.25/1 (solid concentration: 23%)) was applied to a film such that the resin solid content after drying was 3 g/m², then a linear low-density polyethylene film (L-LDPE film: LIX (registered trademark) L4102 manufactured by TOYOBO CO., LTD.) having a thickness of 40 μm was dry-laminated, and the laminate was aged under an environment of 40° C. for 3 days to obtain a laminated film.

The obtained laminated film was cut into 12 inches×8 inches, and formed into a cylindrical shape having a diameter of 3.5 inches, and one end of the cylindrical film was fixed on the fixing head side in the Gelbo-Flex tester while the other end was fixed on the movable head side in the Gelbo-Flex tester, so that the initial holding space was set to 7 inches.

A bending fatigue of giving a torsion of 440 degrees at initial 3.5 inches in the stroke and making a linear horizontal movement over subsequent 2.5 inches to complete the whole stroke was performed 1000 times at a rate of 40 times/min, and pin-holes generated in the laminated film were counted. Measurement was performed under an environment of 1° C. The measurement was performed three times, and pin-hole resistance was evaluated with the average of the measurements.

(3) Haze

Measurement was performed in accordance with JIS-K-7105 using a direct-read haze meter No. 206 manufactured by Toyo Seiki Seisaku-Sho, Ltd.

A haze was calculated from the equation: haze (%)=[Td (diffusion transmittance %)/Tt (total light transmittance %)]×100.

(4) Static Friction Coefficient

Surfaces that were not in contact with a cooling roll in an extrusion step were combined, and a static friction coefficient was measured under an environment of a temperature of 23° C. and a relative humidity of 65% RH in accordance with JIS-K-7125.

(5) Laminate Strength

Laminate strength was measured to know the cohesive fracture resistance strength in the thickness direction of the film.

The laminated film described in the evaluation of pin-hole resistance was cut into a strip shape having a width of 15 mm and a length of 100 mm, one end of the laminated film was peeled at an interface between the biaxially oriented polyamide-based resin film and the linear low-density polyethylene film, laminate strength was measured five times under conditions of a temperature of 23° C., a relative humidity of 65% RH, a tensile speed of 200 mm/minute and a peeling angle of 90° using Tensilon Model UMT-II-500 manufactured by Toyo Baldwin Co., Ltd.

(6) Laminate Strength Under Water Attaching Conditions

Laminate strength was measured while water was dropped to the peeled interface of the strip-shaped laminate film using a pipette.

(7) Whitening After Boiling

Two sheets having a size of 12 cm×12 cm (seal width at each side: 1 cm) were cut out from the laminated film described in the evaluation of pin-hole resistance, sealed at three sides, then filled with 100 ml of water, and further sealed to prepare a four-side-sealed bag. The bag was boiled at 95° C. for 30 minutes, and then immersed in cold water, and the external appearance of the film was observed.

"Polyamide Resin"

A chip A was made of nylon 6 [GLAMIDE (registered trademark) T-810 manufactured by TOYOBO CO., LTD] obtained by ring-opening polymerization of ε-caprolactam using a batch type polymerization tank, and its relative viscosity was 2.8 as a measured value at 20° C. (when a 96% concentrated sulfuric acid solution was used). The glass transition temperature Tg, the low-temperature crystallization temperature Tc, and the melting point Tm (the chip was melted, rapidly cooled, crushed, and measured by a differential scanning calorimeter at a temperature elevation rate of 10° C./minute) were 40° C., 68° C. and 225° C., respectively.

A chip B was prepared by melting and kneading 95.0% by mass of the chip A and 5.0% by mass of ethylene-bis-stearic acid amide [LIGHT-AMIDE WE-183 (product name) manufactured by KYOEISHA CHEMICAL Co., LTD] by a twin-screw vent type extruder, and then cutting the resultant by a strand cutting method.

A chip C was prepared by melting and kneading 95.0% by mass of the chip A and 5.0% by mass of porous aggregated silica [Silysia 350 (product name) manufactured by FUJI SILYSIA CHEMICAL Co., LTD., a pore volume is 1.6 ml/g, an average particle size is 3.9 μm] by a twin-screw vent type extruder, and then cutting the resultant by a strand cutting method.

The properties of chips A to C are shown in Table 1.

"Polyamide-Based Block Copolymer (Elastomer)"

Elastomers A to P were obtained by polymerization in accordance with the polyamide-based block copolymer composition table shown in Table 2. ε-Caprolactam, γ-butyrolactam or ω-lauric lactam as a hard part, adipic acid [Adipic Acid (product name) manufactured by Ube Industries, Ltd.] as a binding part in a molar number equal to that of the polyoxyalkylene glycol described below, and polyoxytetramethylene glycol, polyoxypropylene glycol or polyoxyethylene glycol as a soft part were added in a 70 liter pressure vessel equipped with a stirrer, a thermometer, a torque meter, a pressure gauge, a nitrogen inlet, a pressure control unit and a polymer takeout port, the interior of the vessel was sufficiently purged with nitrogen, and gradual heating was performed while a nitrogen gas was supplied at a flow rate of 300 liters/minute. The temperature was elevated from room temperature to 230° C. over 3 hours, and polymerization was performed at 230° C. for 6 hours. Subsequent to the start of heating, the pressure in the vessel was adjusted to 0.05 MPa.

Next, stirring was stopped, and a polymer molten was taken out in the form of a strand from the polymer takeout port, and cut by an underwater cutting method to prepare elastomers A to P.

"Method for Producing Film"

A polyamide-based resin mixture adjusted so as to have a moisture content of 0.09% by mass using a double cone type vacuum blender was supplied to a single screw extruder for core layer and a single screw extruder for skin layer to melt the mixture. Thereafter, the molten mixture was laminated so as to provide a structure of skin layer A/core layer B/skin layer A by a feed block, extruded in the form of a sheet from a T-die, and brought into adhesion with a cooling roll temperature-regulated to 40° C. using an electrostatic adhesion method, thereby obtaining an unstretched sheet having a thickness of about 200 μm.

Electrostatic adhesion was performed by applying a direct-current voltage of 8 kV to an electrode in which tungsten needles having a tip curvature radius of 0.04 mm, a diameter of 2 mm, and a length of 30 mm were embedded at a pitch of 1 mm.

The obtained unstretched sheet was guided to a roll type stretching machine, stretched in the longitudinal direction at a ratio of 1.8 at 80° C. using a circumferential speed difference, and then further stretched at ratio of 1.8 at 70° C. Subsequently, the uniaxially stretched film was continuously guided to a tenter type stretching machine, preheated in a 110° C. zone, then stretched in the lateral direction at a ratio of 1.2 in a 120° C. zone and at a ratio of 1.7 in a 130° C. zone and at a ratio of 2.0 in a 160° C. zone, and allowed to pass through a 180° C. zone and a 210° C. zone to subject the film to a heat fixing treatment. Thereafter, the film was relaxation-treated at a rate of 3% in a 210° C. zone and at a rate of 2% in a 185° C. zone, and allowed to pass through a 120° C. zone and a 60° C. zone to cool the film. The film was guided to a film winder, and wound with both end parts cut and removed, thereby obtaining a biaxially oriented polyamide-based resin film having a thickness of 15 μm. The layer constitution ratios of the skin layer A and the skin layer B are shown in Table 3.

EXAMPLES 1 TO 15 AND COMPARATIVE EXAMPLES 1 TO 10

Biaxially oriented polyamide-based resin films of Examples 1 to 15 and Comparative Examples 1 to 10 were obtained using the above described film production method by performing mixing as in Table 3 using the polyamide resin shown in Table 1 and the polyamide-based block copolymer shown in Table 2.

Laminate strength, pin-hole resistance in the Gelbo-Flex test, haze, impact strength, static friction coefficient, and whitening after boiling were evaluated using each of the biaxially oriented polyamide-based resin film obtained. Evaluation results in Examples 1 to 15 are shown in Table 4 and evaluation results in Comparative Examples 1 to 10 are shown in Table 5.

From Table 4, it is apparent that the films of Examples 1 to 15 are excellent in laminate strength, pin-hole resistance in the Gelbo-Flex test, haze, impact strength, static friction coefficient, and external appearance after boiling treatment. On the other hand, it is apparent from Table 5 that the films of Comparative Examples 1 to 10 do not secure both laminate strength and pin-hole resistance, are poor in transparency, or are whitened after boil treatment.

TABLE 1

| | base material | | additive | |
|---|---|---|---|---|
| | type | relative viscosity | type | addition amount |
| chip A | Ny6 | 2.9 | — | — |
| chip B | Ny6 | 2.9 | LIGHT-AMIDE WE-183 | 5.0 |
| chip C | Ny6 | 2.9 | Silysia 350 | 5.0 |

TABLE 2

| | hard part | soft part | weight average molecular weight of soft part | hard part/ soft part [part by mass] | 478.74* $Mw^{-0.2989}$ | forming of chip |
|---|---|---|---|---|---|---|
| elastomer A | ε-caprolactam Caprolactam manufactured by Sumitomo Chemical Co.. Ltd. | polyoxytetramethylene glycol PolyTHF2000S (product name) manufactured by BASF Japan Ltd. | 2000 | 37/63 | 49.4 | ○ |
| elastomer B | ε-caprolactam | polyoxytetramethylene glycol PTMG1500 (product name) manufactured by Mitsubishi Chemical Co., Ltd. | 1500 | 37/63 | 53.8 | ○ |
| elastomer C | ε-caprolactam | polyoxytetramethylene glycol PolyTHF1000S (product name) manufactured by BASF Japan Ltd. | 1000 | 37/63 | 60.7 | ○ |
| elastomer D | ε-caprolactam | polyoxytetramethylene glycol | 1000 | 28/72 | 60.7 | ○ |
| elastomer E | ε-caprolactam | polyoxytetramethylene glycol | 1000 | 20/80 | 60.7 | ○ |
| elastomer F | ε-caprolactam | polyoxytetramethylene glycol PTMG850 (product name) manufactured by Mitsubishi Chemical Co., Ltd. | 850 | 32.5/67.5 | 63.8 | ○ |
| elastomer G | ε-caprolactam | polyoxytetramethylene glycol | 850 | 24/76 | 63.8 | ○ |
| elastomer H | ε-caprolactam | polyoxytetramethylene glycol PTMG650 (product name) manufactured by Mitsubishi Chemical Co., Ltd. | 650 | 27/76 | 69.1 | ○ |
| elastomer I | ε-caprolactam | polyoxypropylene glycol sannixPP1000 (product name) manufactured by Sanyo Chemical | 1000 | 37/63 | 60.7 | ○ |
| elastomer J | γ-butyrolactone manufactured by Mitsubishi Chemical Co., Ltd. | polyoxytetramethylene glycol | 2000 | 37/63 | 49.4 | ○ |
| elastomer K | ε-caprolactam | polyoxytetramethylene glycol | 650 | 40/60 | 69.1 | ○ |
| elastomer L | ε-caprolactam | polyoxytetramethylene glycol | 650 | 55/45 | 69.1 | ○ |
| elastomer M | ε-caprolactam | polyoxyethylene glycol PEG650 (product name) manufactured by American Polymer Standard Corp. | 650 | 50/50 | 69.1 | ○ |
| elastomer N | ε-caprolactam | polyoxytetramethylene glycol | 2000 | 55/45 | 49.4 | ○ |
| elastomer O | ω-lauric lactam aminododecanoic acid (product name) manufactured by Ube Industries. Ltd. | polyoxytetramethylene glycol | 1000 | 60/40 | 60.7 | ○ |
| elastomer P | ω-lauric lactam | polyoxyethylene glycol PEG1000 (product name) manufactured by Dai-ichi Kogyo Seiyaku Co., Ltd. | 1000 | 50/50 | 60.7 | ○ |

TABLE 3

| | layer ratio | | | material formulation | | | | | | | |
|---|---|---|---|---|---|---|---|---|---|---|---|
| | | | | skin layer A | | | | core layer B | | | |
| | skin layer A/ | core layer B/ | skin layer A | chip A/ | chip B/ | chip C/ | elastomer A | chip A/ | chip B/ | chip C/ | elastomer A |
| Example 1 | 1.5/ | 12.0/ | 1.5 | 84.0 | 3.0 | 10.0 | 3.0 | 84.0 | 3.0 | 10.0 | 3.0 |
| Example 2 | skin layer A/ 1.5/ | core layer B/ 12.0/ | skin layer A 1.5 | chip A/ 82.0 | chip B/ 3.0 | chip C/ 10.0 | elastomer A 5.0 | chip A/ 82.0 | chip B/ 3.0 | chip C/ 10.0 | elastomer A 5.0 |
| Example 3 | skin layer A/ 1.5/ | core layer B/ 12.0/ | skin layer A 1.5 | chip A/ 86.0 | chip B/ 3.0 | chip C/ 10.0 | elastomer A 1.0 | chip A/ 86.0 | chip B/ 3.0 | chip C/ 10.0 | elastomer A 1.0 |
| Example 4 | skin layer A/ 1.5/ | core layer B/ 12.0/ | skin layer A 1.5 | chip A/ 84.0 | chip B/ 3.0 | chip C/ 10.0 | elastomer B 3.0 | chip A/ 84.0 | chip B/ 3.0 | chip C/ 10.0 | elastomer B 3.0 |
| Example 5 | skin layer A/ 1.5/ | core layer B/ 12.0/ | skin layer A 1.5 | chip A/ 82.0 | chip B/ 3.0 | chip C/ 10.0 | elastomer C 5.0 | chip A/ 82.0 | chip B/ 3.0 | chip C/ 10.0 | elastomer C 5.0 |
| Example 6 | skin layer A/ 1.5/ | core layer B/ 12.0/ | skin layer A 1.5 | chip A/ 84.0 | chip B/ 3.0 | chip C/ 10.0 | elastomer D 3.0 | chip A/ 84.0 | chip B/ 3.0 | chip C/ 10.0 | elastomer D 3.0 |
| Example 7 | skin layer A/ 1.5/ | core layer B/ 12.0/ | skin layer A 1.5 | chip A/ 84.0 | chip B/ 3.0 | chip C/ 10.0 | elastomer E 3.0 | chip A/ 84.0 | chip B/ 3.0 | chip C/ 10.0 | elastomer E 3.0 |
| Example 8 | skin layer A/ 1.5/ | core layer B/ 12.0/ | skin layer A 1.5 | chip A/ 84.0 | chip B/ 3.0 | chip C/ 10.0 | elastomer F 3.0 | chip A/ 84.0 | chip B/ 3.0 | chip C/ 10.0 | elastomer F 3.0 |
| Example 9 | skin layer A/ 1.5/ | core layer B/ 12.0/ | skin layer A 1.5 | chip A/ 84.0 | chip B/ 3.0 | chip C/ 10.0 | elastomer G 3.0 | chip A/ 84.0 | chip B/ 3.0 | chip C/ 10.0 | elastomer G 3.0 |
| Example 10 | skin layer A/ 1.5/ | core layer B/ 12.0/ | skin layer A 1.5 | chip A/ 84.0 | chip B/ 3.0 | chip C/ 10.0 | elastomer H 3.0 | chip A/ 84.0 | chip B/ 3.0 | chip C/ 10.0 | elastomer H 3.0 |
| Example 11 | skin layer A/ 1.5/ | core layer B/ 12.0/ | skin layer A 1.5 | chip A/ 84.0 | chip B/ 3.0 | chip C/ 10.0 | elastomer I 3.0 | chip A/ 84.0 | chip B/ 3.0 | chip C/ 10.0 | elastomer I 3.0 |
| Example 12 | skin layer A/ 1.5/ | core layer B/ 12.0/ | skin layer A 1.5 | chip A/ 84.0 | chip B/ 3.0 | chip C/ 10.0 | elastomer J 3.0 | chip A/ 84.0 | chip B/ 3.0 | chip C/ 10.0 | elastomer J 3.0 |
| Example 13 | skin layer A/ 1.0/ | core layer B/ 13.0/ | skin layer A 1.0 | chip A/ 84.0 | chip B/ 3.0 | chip C/ 10.0 | elastomer A 3.0 | chip A/ 86.8 | chip B/ 0.2 | chip C/ 10.0 | elastomer K 3.0 |
| Example 14 | skin layer A/ 1.5/ | core layer B/ 12.0/ | skin layer A 1.5 | chip A/ 84.0 | chip B/ 3.0 | chip C/ 10.0 | elastomer G 3.0 | chip A/ 86.7 | chip B/ 0.3 | chip C/ 10.0 | elastomer G 3.0 |
| Example 15 | skin layer A/ 2.5/ | core layer B/ 10.0/ | skin layer A 2.5 | chip A/ 84.0 | chip B/ 3.0 | chip C/ 10.0 | elastomer G 3.0 | chip A/ 86.5 | chip B/ 0.5 | chip C/ 10.0 | elastomer G 3.0 |
| Comparative Example 1 | skin layer A/ 1.5/ | core layer B/ 12.0/ | skin layer A 1.5 | chip A/ 82.0 | chip B/ 3.0 | chip C/ 10.0 | elastomer K 5.0 | chip A/ 82.0 | chip B/ 3.0 | chip C/ 10.0 | elastomer A 5.0 |
| Comparative Example 2 | skin layer A/ 1.5/ | core layer B/ 12.0/ | skin layer A 1.5 | chip A/ 82.0 | chip B/ 3.0 | chip C/ 10.0 | elastomer L 5.0 | chip A/ 82.0 | chip B/ 3.0 | chip C/ 10.0 | elastomer L 5.0 |
| Comparative Example 3 | skin layer A/ 1.5/ | core layer B/ 12.0/ | skin layer A 1.5 | chip A/ 82.0 | chip B/ 3.0 | chip C/ 10.0 | elastomer M 5.0 | chip A/ 82.0 | chip B/ 3.0 | chip C/ 10.0 | elastomer M 5.0 |
| Comparative Example 4 | skin layer A/ 1.5/ | core layer B/ 12.0/ | skin layer A 1.5 | chip A/ 84.0 | chip B/ 3.0 | chip C/ 10.0 | elastomer N 3.0 | chip A/ 84.0 | chip B/ 3.0 | chip C/ 10.0 | elastomer N 3.0 |
| Comparative Example 5 | skin layer A/ 1.5/ | core layer B/ 12.0/ | skin layer A 1.5 | chip A/ 86.0 | chip B/ 3.0 | chip C/ 10.0 | elastomer N 1.0 | chip A/ 86.0 | chip B/ 3.0 | chip C/ 10.0 | elastomer N 1.0 |
| Comparative Example 6 | skin layer A/ 1.5/ | core layer B/ 12.0/ | skin layer A 1.5 | chip A/ 84.0 | chip B/ 3.0 | chip C/ 10.0 | elastomer O 3.0 | chip A/ 84.0 | chip B/ 3.0 | chip C/ 10.0 | elastomer O 3.0 |
| Comparative Example 7 | skin layer A/ 1.5/ | core layer B/ 12.0/ | skin layer A 1.5 | chip A/ 84.0 | chip B/ 3.0 | chip C/ 10.0 | elastomer P 3.0 | chip A/ 84.0 | chip B/ 3.0 | chip C/ 10.0 | elastomer P 3.0 |
| Comparative Example 8 | skin layer A/ 1.5/ | core layer B/ 12.0/ | skin layer A 1.5 | chip A/ 86.5 | chip B/ 3.0 | chip C/ 10.0 | elastomer A 0.5 | chip A/ 86.5 | chip B/ 3.0 | chip C/ 10.0 | elastomer A 0.5 |
| Comparative Example 9 | skin layer A/ 1.5/ | core layer B/ 12.0/ | skin layer A 1.5 | chip A/ 78.0 | chip B/ 3.0 | chip C/ 10.0 | elastomer A 9.0 | chip A/ 78.0 | chip B/ 3.0 | chip C/ 10.0 | elastomer A 9.0 |
| Comparative Example 10 | skin layer A/ 1.5/ | core layer B/ 12.0/ | skin layer A 1.5 | chip A/ 78.0 | chip B/ 3.0 | chip C/ 10.0 | elastomer K 9.0 | chip A/ 78.0 | chip B/ 3.0 | chip C/ 10.0 | elastomer K 9.0 |

TABLE 4

| | | | polyamide-based block copolymer | | | | |
|---|---|---|---|---|---|---|---|
| | | | | soft part | | | |
| | thickness [μm] | hard part monomer | monomer | molecular weight Mn | Y part by mass | 478.74* $Mn^{-0.2989}$ | content [% by mass] |
| Example 1 | 15 | ε-caprolactam | polyoxy-tetramethylene glycol | 2000 | 63 | 49.4 | 3.0 |
| Example 2 | 15 | ε-caprolactam | polyoxy-tetramethylene glycol | 2000 | 63 | 49.4 | 5.0 |
| Example 3 | 15 | ε-caprolactam | polyoxy-tetramethylene glycol | 2000 | 63 | 49.4 | 1.0 |
| Example 4 | 15 | ε-caprolactam | polyoxy-tetramethylene glycol | 1500 | 63 | 53.8 | 3.0 |

TABLE 4-continued

| | | | | | | | |
|---|---|---|---|---|---|---|---|
| Example 5 | 15 | ε-caprolactam | polyoxytetramethylene glycol | 1000 | 63 | 60.7 | 5.0 |
| Example 6 | 15 | ε-caprolactam | polyoxytetramethylene glycol | 1000 | 72 | 60.7 | 3.0 |
| Example 7 | 15 | ε-caprolactam | polyoxytetramethylene glycol | 1000 | 80 | 60.7 | 3.0 |
| Example 8 | 15 | ε-caprolactam | polyoxytetramethylene glycol | 850 | 67.5 | 63.8 | 3.0 |
| Example 9 | 15 | ε-caprolactam | polyoxytetramethylene glycol | 850 | 76 | 63.8 | 3.0 |
| Example 10 | 15 | ε-caprolactam | polyoxytetramethylene glycol | 650 | 76 | 69.1 | 3.0 |
| Example 11 | 15 | ε-caprolactam | polyoxypropylene glycol | 1000 | 63 | 60.7 | 3.0 |
| Example 12 | 15 | γ-butyrolactone | polyoxytetramethylene glycol | 2000 | 63 | 49.4 | 3.0 |
| Example 13 | 15 | ε-caprolactam | polyoxytetramethylene glycol | 2000 | 63 | 49.4 | 3.0 |
| Example 14 | 15 | ε-caprolactam | polyoxytetramethylene glycol | 2000 | 63 | 49.4 | 3.0 |
| Example 15 | 15 | ε-caprolactam | polyoxytetramethylene glycol | 2000 | 63 | 49.4 | 3.0 |

| | laminate Strength [N/15 mm] | Gelbo-Flex test [average of the number of defect (3 times)] | haze [%] | impact strength [J] | static friction coefficient [—] | whitening after boiling |
|---|---|---|---|---|---|---|
| Example 1 | 7.3 | 1.3 | 3.6 | 0.96 | 0.55 | no existance |
| Example 2 | 7.0 | 0.3 | 4.0 | 0.95 | 0.60 | no existance |
| Example 3 | 7.8 | 3.5 | 3.0 | 1.05 | 0.50 | no existance |
| Example 4 | 7.4 | 1.6 | 2.8 | 1.00 | 0.53 | no existance |
| Example 5 | 7.5 | 4.2 | 2.7 | 1.05 | 0.54 | no existance |
| Example 6 | 7.3 | 2.0 | 2.1 | 1.03 | 0.58 | no existance |
| Example 7 | 7.6 | 1.8 | 2.7 | 1.05 | 0.57 | no existance |
| Example 8 | 7.4 | 4.5 | 2.7 | 1.02 | 0.52 | no existance |
| Example 9 | 7.1 | 2.7 | 3.0 | 1.17 | 0.55 | no existance |
| Example 10 | 7.0 | 3.5 | 2.8 | 1.22 | 0.52 | no existance |
| Example 11 | 7.6 | 2.1 | 3.2 | 1.04 | 0.57 | no existance |
| Example 12 | 7.0 | 1.5 | 3.5 | 0.97 | 0.59 | no existance |
| Example 13 | 7.5 | 1.2 | 3.5 | 0.95 | 0.60 | no existance |
| Example 14 | 7.3 | 1.1 | 3.6 | 0.97 | 0.58 | no existance |
| Example 15 | 7.0 | 1.3 | 3.7 | 0.96 | 0.55 | no existance |

TABLE 5

| | | | polyamide-based block copolymer | | | | |
|---|---|---|---|---|---|---|---|
| | | | | soft part | | | |
| | thickness [μm] | hard part monomer | monomer | molecular weight Mn | Y part by mass | 478.74* $Mn^{-0.2989}$ | content [% by mass] |
| Comparative Example 1 | 15 | ε-caprolactam | polyoxytetramethylene glycol | 650 | 60 | 69.1 | 5.0 |
| Comparative Example 2 | 15 | ε-caprolactam | polyoxytetramethylene glycol | 650 | 45 | 69.1 | 5.0 |
| Comparative Example 3 | 15 | ε-caprolactam | polyoxyethylene glycol | 650 | 50 | 69.1 | 5.0 |
| Comparative Example 4 | 15 | ω-lauric lactam | polyoxytetramethylene glycol | 2000 | 45 | 49.4 | 3.0 |

TABLE 5-continued

| | | | | | | | |
|---|---|---|---|---|---|---|---|
| Comparative Example 5 | 15 | ω-lauric lactam | polyoxytetramethylene glycol | 2000 | 45 | 49.4 | 1.0 |
| Comparative Example 6 | 15 | ω-lauric lactam | polyoxytetramethylene glycol | 1000 | 40 | 60.7 | 3.0 |
| Comparative Example 7 | 15 | ω-lauric lactam | polyoxyethylene | 1000 | 50 | 60.7 | 3.0 |
| Comparative Example 8 | 15 | ε-caprolactam | polyoxytetramethylene glycol | 2000 | 63 | 49.4 | 0.5 |
| Comparative Example 9 | 15 | ε-caprolactam | polyoxytetramethylene glycol | 2000 | 63 | 49.4 | 9.0 |
| Comparative Example 10 | 15 | ε-caprolactam | polyoxytetramethylene glycol | 650 | 60 | 69.1 | 9.0 |

| | laminate Strength [N/15 mm] | Gelbo-Flex test [average of the number of defect (3 times)] | haze [%] | impact strength [J] | static friction coefficient [—] | whitening after boiling |
|---|---|---|---|---|---|---|
| Comparative Example 1 | 7.2 | 6.2 | 2.8 | 1.07 | 0.55 | no existance |
| Comparative Example 2 | 7.5 | 8.4 | 2.2 | 1.13 | 0.52 | no existance |
| Comparative Example 3 | 7.0 | 6.9 | 2.9 | 1.02 | 0.54 | existance |
| Comparative Example 4 | 2.5 | 1.6 | 3.1 | 1.16 | 0.53 | no existance |
| Comparative Example 5 | 4.0 | 3.6 | 2.2 | 1.19 | 0.52 | no existance |
| Comparative Example 6 | 3.0 | 6.6 | 2.5 | 1.21 | 0.55 | no existance |
| Comparative Example 7 | 2.7 | 6.1 | 3.2 | 1.00 | 0.58 | existance |
| Comparative Example 8 | 8.0 | 6.0 | 1.8 | 1.20 | 0.50 | no existance |
| Comparative Example 9 | 6.5 | 0.0 | 6.0 | 0.80 | 0.68 | no existance |
| Comparative Example 10 | 6.7 | 3.2 | 2.8 | 0.85 | 0.60 | no existance |

INDUSTRIAL APPLICABILITY

The biaxially oriented polyamide-based resin film of the present invention has excellent performance as described above, and therefore can be applied to not only small bags for soups, but also pickled vegetable bags, large liquid product bags for business use, and bag-in-boxes, and further applied to packaging materials having a high design property.

The invention claimed is:

1. A biaxially oriented polyamide-based resin film comprising a polyamide resin and a polyamide-based block copolymer, wherein
the polyamide-based resin film comprises 1 to 3% by mass of the polyamide-based block copolymer,
the polyamide-based block copolymer comprises a hard part including a residue of cyclic lactam having 4 to 10 carbon atoms, and a soft part including a residue of polyoxypropylene glycol or polyoxytetramethylene glycol, wherein the soft part has a number average molecular weight of 1000 to 3000, and the content X of the hard part, the content Y of the soft part, and the number average molecular weight Mn of the soft part satisfy the following formulae (1) and (2):

$$X + Y = 100 \text{(parts by mass)} \quad (1)$$

$$478.74 \times Mn^{-0.2989} \le Y \le 93 \quad (2),$$

the polyamide-based resin film has a haze measured in accordance with JIS-K-7105 of not more than 3.7%, and
the number of pin-holes generated in a laminated film formed by laminating a polyethylene film having a thickness of 40 μm on the biaxially oriented polyamide-based resin film is 2.1 or less.

2. The biaxially oriented polyamide-based resin film according to claim 1, wherein the biaxially oriented polyamide-based resin film contains 0.05 to 0.30% by mass of ethylene-bis-stearic acid amide, and the biaxially oriented polyamide-based resin film contains 0.3 to 0.8% by mass of porous aggregated silica having a pore volume of 1.0 to 1.8 ml/g and an average particle size of 2.0 to 7.0 μm.

3. The biaxially oriented polyamide-based resin film according to claim 2, wherein a layer configuration of the biaxially oriented polyamide-based resin film is a single layer configuration or a co-extrusion laminated configuration of two or more layers.

4. A method for producing the film according to claim 3, wherein a polyamide-based resin sheet cooled and solidified by an electrostatic adhesion method is stretched in a longitudinal direction at two stages, then stretched in a lateral direction in a differential-temperature manner with the stretching end temperature being higher than the stretching start temperature, then subjected to a heat fixing treatment, then subjected to an initial relaxation treatment, and subjected to a re-relaxation treatment at a temperature lower than the initial relaxation temperature.

5. A method for producing the film according to claim 2, wherein a polyamide-based resin sheet cooled and solidified by an electrostatic adhesion method is stretched in a longitudinal direction at two stages, then stretched in a lateral direction in a differential-temperature manner with the stretching end temperature being higher than the stretching start temperature, then subjected to a heat fixing treatment, then subjected to an initial relaxation treatment, and subjected to a re-relaxation treatment at a temperature lower than the initial relaxation temperature.

6. The biaxially oriented polyamide-based resin film according to claim 1, wherein a layer configuration of the biaxially oriented polyamide-based resin film is a single layer configuration or a co-extrusion laminated configuration of two or more layers.

7. A method for producing the film according to claim 6, wherein a polyamide-based resin sheet cooled and solidified by an electrostatic adhesion method is stretched in a longitudinal direction at two stages, then stretched in a lateral direction in a differential-temperature manner with the stretching end temperature being higher than the stretching start temperature, then subjected to a heat fixing treatment, then subjected to an initial relaxation treatment, and subjected to a re-relaxation treatment at a temperature lower than the initial relaxation temperature.

8. A method for producing the film according to claim 1, wherein a polyamide-based resin sheet cooled and solidified by an electrostatic adhesion method is stretched in a longitudinal direction at two stages, then stretched in a lateral direction in a differential-temperature manner with the stretching end temperature being higher than the stretching start temperature, then subjected to a heat fixing treatment, then subjected to an initial relaxation treatment, and subjected to a re-relaxation treatment at a temperature lower than the initial relaxation temperature.

9. The biaxially oriented polyamide-based resin film according to claim 1, wherein the polyamide-based resin film has a haze of not more than 3.6%.

* * * * *